United States Patent [19]

Pleet et al.

[11] Patent Number: 5,368,195
[45] Date of Patent: Nov. 29, 1994

[54] PRESSURIZED BAG-IN-BOTTLE LIQUID DISPENSING SYSTEM

[76] Inventors: Lawrence Pleet, 9 Flintlock La., Bell Canyon, Calif. 91307; Richard J. Heminuk, 3277 Cherie Dr., Simi Valley, Calif. 93063

[21] Appl. No.: 61,194

[22] Filed: May 13, 1993

[51] Int. Cl.$^5$ .................. B65D 35/28; G01F 11/00
[52] U.S. Cl. ........................ 222/52; 222/95; 222/105; 222/144.5; 222/146.6; 222/219; 222/263; 222/494
[58] Field of Search ........ 222/52, 54, 95, 105, 222/183, 217-219, 146.5, 146.1, 146.6, 144.5, 389, 386.5, 256, 257, 258, 262, 263, 148, 571, 494

[56] References Cited

U.S. PATENT DOCUMENTS

| | | | |
|---|---|---|---|
| 2,427,680 | 9/1947 | Leonard | 222/219 X |
| 2,513,455 | 7/1950 | Cornelius | 222/386.5 |
| 3,167,398 | 1/1965 | Whittington | 222/219 X |
| 3,172,578 | 3/1965 | Kemp | 222/219 |
| 3,387,748 | 6/1968 | Brenchley | 222/219 X |
| 3,394,850 | 7/1968 | Volkober | 222/219 |
| 3,459,338 | 8/1969 | Lee et al. | 222/219 |
| 3,871,553 | 3/1975 | Steinberg | 222/95 |
| 3,895,748 | 7/1975 | Klingenberg | 222/571 |
| 4,032,044 | 6/1977 | Flynn et al. | 222/263 X |
| 4,109,831 | 8/1978 | Culpepper | 222/263 X |
| 4,124,147 | 11/1978 | Priese et al. | 222/263 X |
| 4,484,697 | 11/1984 | Fry, Jr. | 222/386.5 X |
| 4,767,028 | 8/1988 | Rohlfing et al. | 222/219 |
| 4,796,788 | 1/1989 | Bond | 222/386.5 X |
| 4,921,135 | 5/1990 | Pleet | 222/95 X |
| 4,927,057 | 5/1990 | Janko et al. | 222/52 X |
| 4,957,226 | 9/1990 | Pacia | 222/205 X |
| 4,999,124 | 3/1991 | Copeland | 222/52 X |
| 5,052,594 | 10/1991 | Sorby | 222/571 X |
| 5,251,787 | 10/1993 | Simson | 222/389 X |

Primary Examiner—Kevin P. Shaver
Attorney, Agent, or Firm—Kelly Bauersfeld & Lowry

[57] ABSTRACT

A fluid dispenser system is provided for accurate delivery of a viscous or semi-viscous fluid. The dispenser system includes a pressure station for receiving a bottle filled with the selected fluid substance, and for pressurizing the bottle for fluid flow therefrom. In the preferred form, the fluid passes through a metering unit to a dispenser gun having a manually operated trigger. The metering unit responds to trigger operation to deliver a metered volume of the fluid to the dispenser gun for dispensing via a spout. The system is designed for quickly and easily dispensing a rapid succession of accurately metered volumes. The dispenser system is particularly suited for use in dispensing condiments in a fast food restaurant environment, or for dispensing metered volumes of paints and/or pigments used in mixing paints, or for handling other flowable materials such as adhesives and the like.

42 Claims, 6 Drawing Sheets

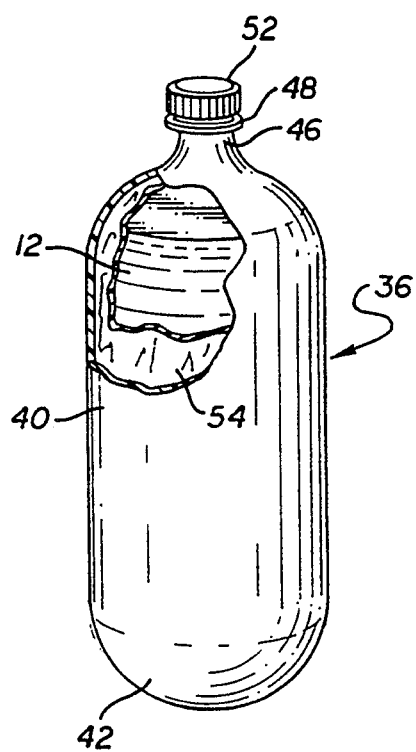
FIG. 3
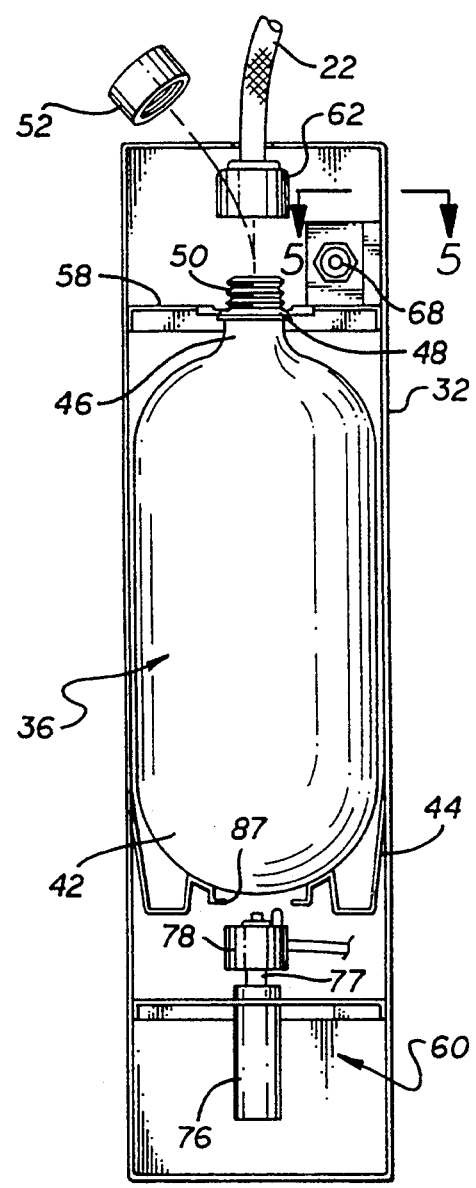
FIG. 4
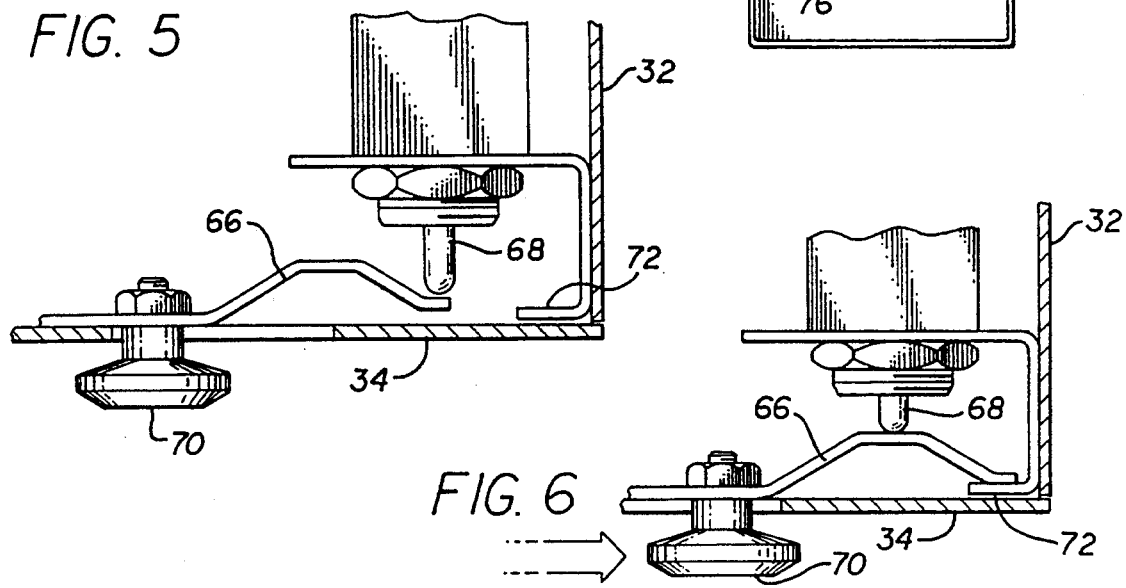
FIG. 5
FIG. 6

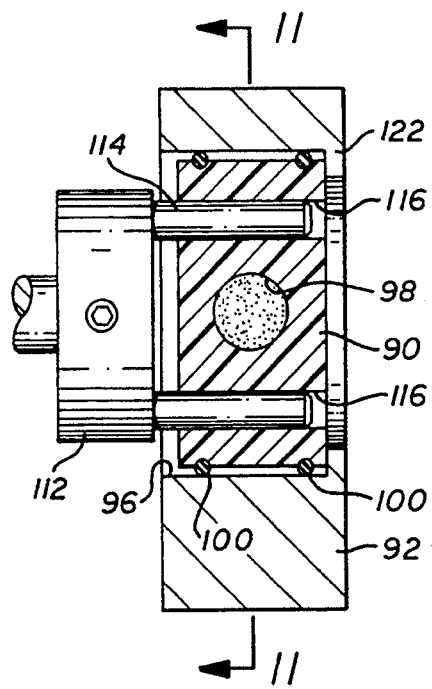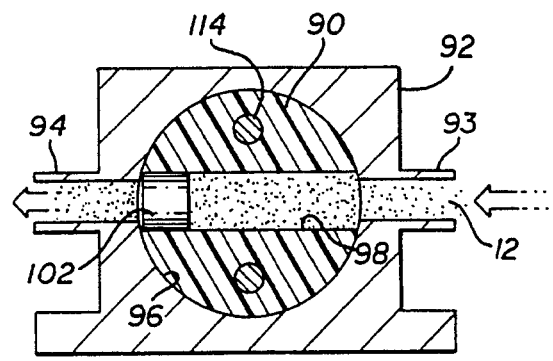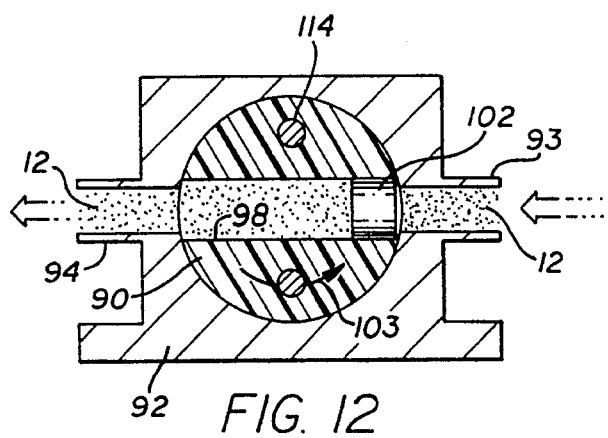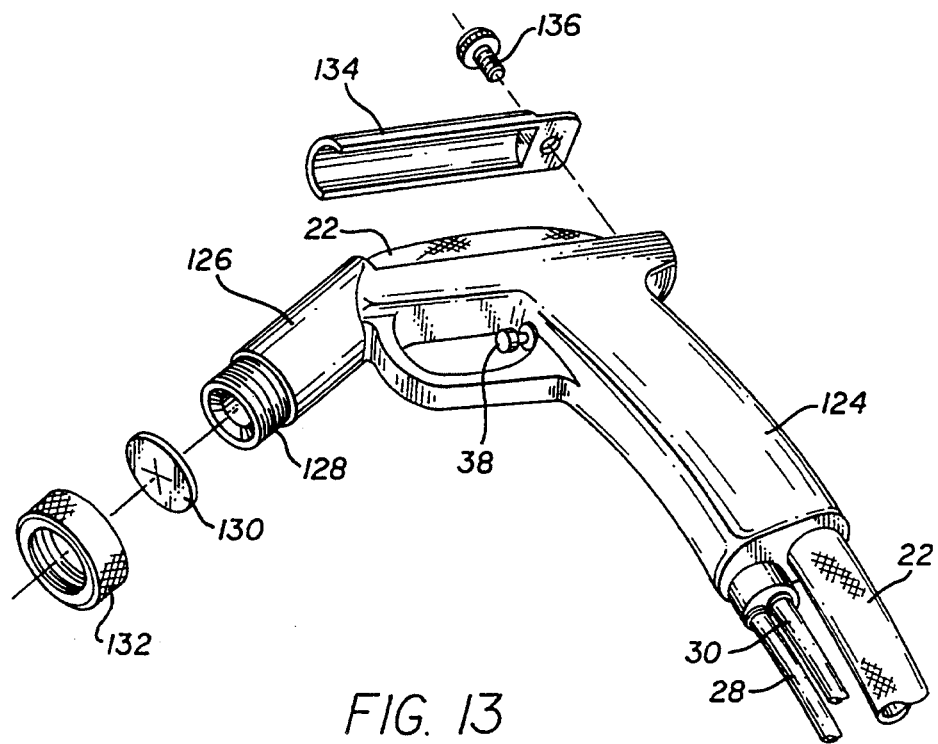
FIG. 10
FIG. 11
FIG. 12
FIG. 13

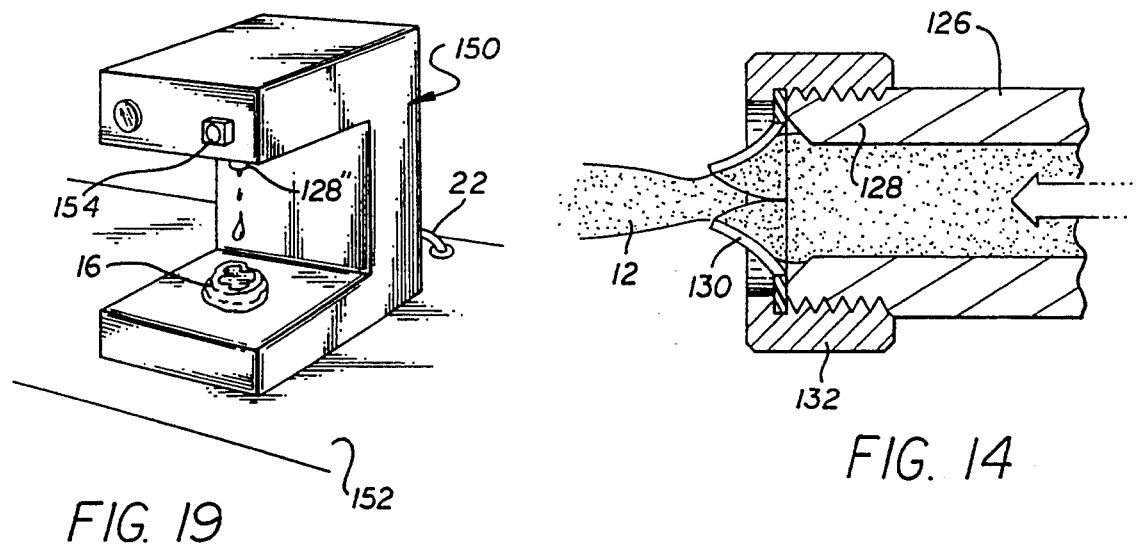
FIG. 19
FIG. 14
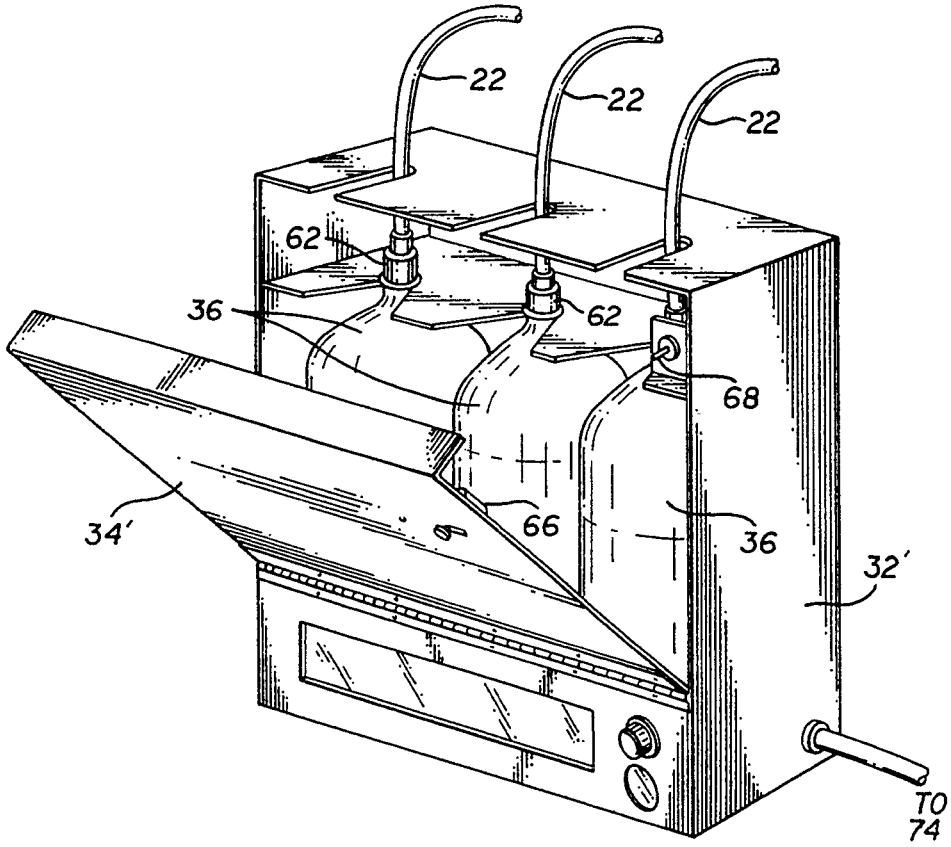
FIG. 15

FIG. 16
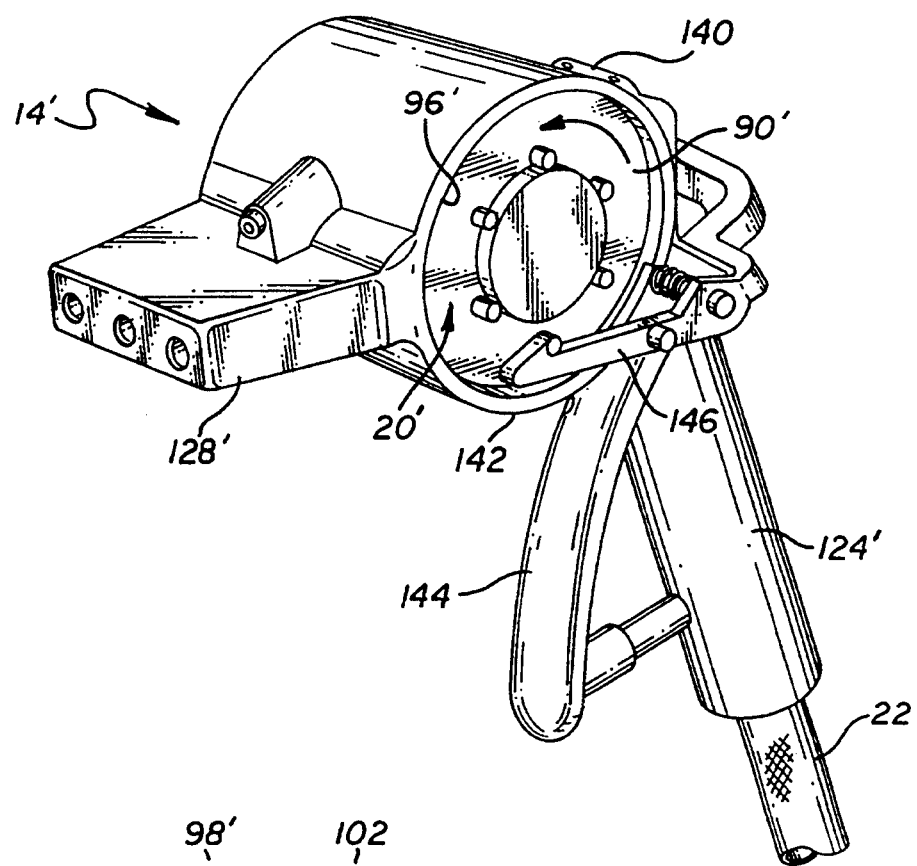
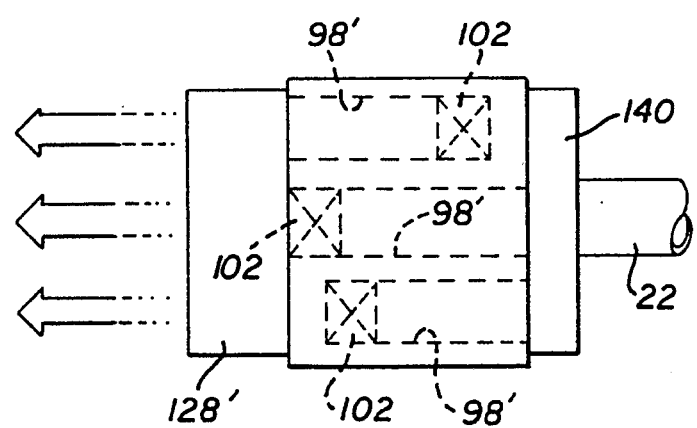
FIG. 17
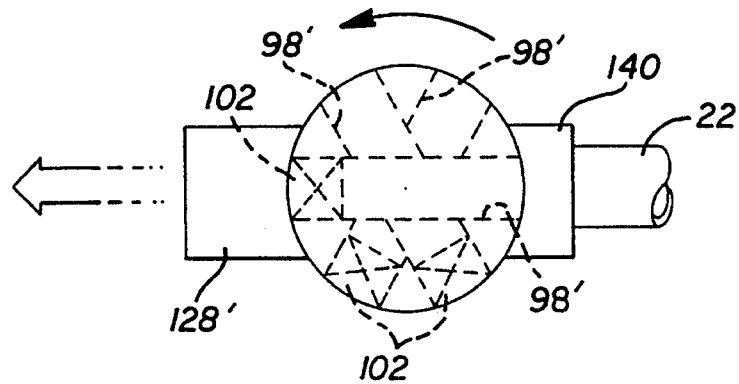
FIG. 18

PRESSURIZED BAG-IN-BOTTLE LIQUID DISPENSING SYSTEM

BACKGROUND OF THE INVENTION

This invention relates generally to dispenser systems for precision delivery or dispensing of viscous or semi-viscous fluid. More specifically, this invention relates to an improved dispenser system designed for facilitated pressure-caused fluid dispensing, preferably in rapid succession of metered fluid volumes, and in a manner which substantially minimizes or eliminates significant operator fatigue. The dispenser system is adapted for use in a range of different applications, including but not limited to dispensing of condiments in a fast food restaurant environment.

Fluid dispenser systems are generally known in the art for use in handling and dispensing measured quantities of relatively viscous or semi-viscous fluids. As one example, in a fast food restaurant, condiments such as catsup, mustard, tartar sauce, etc., are commonly dispensed in the course of production and preparation of fast food items such as sandwiches and the like. In this environment, the selected condiment must be applied quickly and in accurately metered doses to a succession of sandwiches or other food items, in a manner maintaining consistent product quality and taste characteristics.

In the past, various dispenser devices have been proposed for use in handling and dispensing condiments in a restaurant environment. For example, cartridge-type dispenser guns have been proposed wherein a ratchet-operated power piston is advanced through a disposable condiment-filled cartridge to force the cartridge contents through an open nozzle tip. Such devices, however, generally have not provided measured doses having adequate volumetric repeatability. Moreover, the volumetric capacity of the disposable cartridge is relatively limited in order to minimize the total weight of the dispenser gun and operator fatigue associated with manipulation of the filled cartridge, with the undesirable result that frequent cartridge replacement is required in the course of a normal work shift.

Alternative condiment dispenser devices have utilized manually reciprocal pump elements to dispense flow able condiments in roughly uniform doses. Such dispenser systems, however, are generally incompatible with kitchen usage fast foot restaurant or the like, since each food item must be transported to the pump dispenser. Accordingly, such pump dispenser devices are normally employed at a customer self-service counter whereat customers can select and dispense condiments on their own. In this latter location, restaurant personnel are required to monitor and refill each customer operated pump dispenser on an as-needed basis. Moreover, customer access to the pump dispenser creates a potential for condiment wastage and/or contamination.

Similar ratchet-type and/or pump devices have been used to dispense viscous or semi-viscous fluids in other applications. By way of example, paints and/or pigments used therein are often dispensed in metered quantities to provide a custom-mixed paint of selected color. Adhesives are also dispensed in metered volumes in many industrial applications, frequently by dispensing and mixing proportioned volumes of base and accelerator materials used in form polymerizable epoxy resins. In all of these fluid dispense environments, rapid and accurately repeatable dispensing of metered volumes has remained a persistent problem.

The present invention provides an improved dispenser system designed particularly for use in highly repeatable dispensing of viscous or semi-viscous fluids, wherein the improved dispenser system is adapted to dispense the fluid quickly and easily and with minimal operator fatigue.

SUMMARY OF THE INVENTION

In accordance with the invention, a fluid dispensing system is provided for handling and accurate dispensing of a viscous or semi-viscous flowable substance. The dispenser system comprises a pressurized supply station for receiving a relatively large supply of the selected fluid and for subjecting the fluid to pressure for regulated outflow through a delivery conduit. In the preferred form, a metering unit is mounted along the delivery conduit between the supply station and a dispenser gun having a manually operated trigger. The metering unit responds to trigger operation to deliver an accurate and repeatably measured dose of the fluid to a spout through which the metered volume is dispensed. The system will be shown and described with respect to metered condiment dispensing in a fast food restaurant environment or the like, although it will be understood that the invention is applicable to a variety of different fluid dispensing applications.

In accordance with the preferred form of the invention, the supply of the fluid such as a selected condiment is contained within a storage bottle having a relatively rigid or semirigid outer shell and a comparatively non-rigid or flexible inner liner. The flexible inner liner has the condiment carried therein for pressure-forced flow from the bottle in response to pressure applied to the space between the outer shell and the inner liner. In this regard, a supply station housing is provided for removable reception of the storage bottle with the bottle mouth connected to the delivery conduit via an adaptor cap. When the storage bottle is installed into the housing, and a safety door thereof moved to a closed and locked position, a pressure valve engages the bottle for flow communication of a pressurized gas source with a pressure port formed in the outer shell.

In the preferred form, the delivery conduit flow-couples the condiment to the metering unit which has a rotatable core defining an internal cylinder of fixed volume. A metering piston is mounted within the core cylinder for displacement from one end to the other. The pressurized flow of condiment from the storage bottle displaces the metering piston from the upstream end to the downstream end of the cylinder, resulting dispensing of a correspondingly metered volume through the delivery conduit and dispenser gun. The rotatable core is then indexed through a half revolution stroke to return the metering piston to the upstream end of the cylinder, and the process is repeated.

The dispenser gun includes the trigger operable to rotate the core through a half revolution stroke for dispensing the metered dose, as described above. The trigger may comprise a pneumatic trigger switch for operating a bidirectional actuator connected to the rotatable core of the metering unit. In another alternative form, the rotatable core may be carried within the body of the dispenser gun, wherein the trigger may comprise a manually retractable lever for operating the rotatable core through part-rotation strokes by means of a ratchet mechanism. In addition, the rotatable core mounted within the body of the dispenser gun may include multiple internal cylinders each having a metering piston mounted therein.

In a preferred configuration of the invention, the dispenser gun comprises a hand-held implement which may be employed by restaurant personnel or the like for quickly and easily dispensing metered volumes of the selected condiment in the course of production food item preparation, for example, in a fast food restaurant. In one alternative, the dispenser gun may be installed within a dispenser station housing located, for example, at a customer self-service counter, with a trigger switch exposed for customer access. Depression of the trigger switch in this configuration operates the metering unit to dispense a measured volume of the selected condiment.

Other feature and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a perspective view illustrating a preferred supply bottle containing a viscous or semi-viscous fluid to be dispensed, with portions broken away to illustrate construction details of the supply bottle;

FIG. 4 is an enlarged vertical sectional view illustrating the supply bottle mounted within a pressure station housing;

FIG. 5 is an enlarged fragmented horizontal sectional view taken generally on the line 5—5 of FIG. 4, and illustrating a safety door for the pressure station housing in a closed but unlocked position;

FIG. 6 is a fragmented horizontal sectional view similar to FIG. 5, and illustrating the safety door in a closed and locked position;

FIG. 10 is an enlarged fragmented vertical sectional view taken generally on the line 10—10 of FIG. 1;

FIG. 11 is a vertical sectional view taken generally on the line 11—11 of FIG. 10, and showing movement of a metering piston to a downstream position within a metering cylinder;

FIG. 12 is an enlarged fragmented sectional view similar to FIG. 11, and illustrating movement of a rotatable core to result in displacement of the metering piston to an upstream end of the metering cylinder;

FIG. 13 is an enlarged fragmented and exploded perspective view depicting a preferred dispenser gun for use in the invention;

FIG. 14 is an enlarged fragmented sectional view illustrating a drip-free spout for use in the dispenser gun;

FIG. 15 is a fragmented perspective view illustrating a modified pressure station housing having multiple supply bottles mounted therein;

FIG. 16 is an enlarged fragmented perspective view depicting an alternative form of a dispenser gun for use in the invention;

FIG. 17 is a top plan view, shown somewhat in schematic form, illustrating the dispenser gun of FIG. 16;

FIG. 18 is a side elevation view, shown somewhat in schematic form, of the dispenser gun of FIG. 16; and FIG. 19 is a fragmented perspective view depicting a further modified form of the invention.

DETAILED DESCRIPTION OF THE PREFERRED EMBODIMENTS

Figures 1, 2:
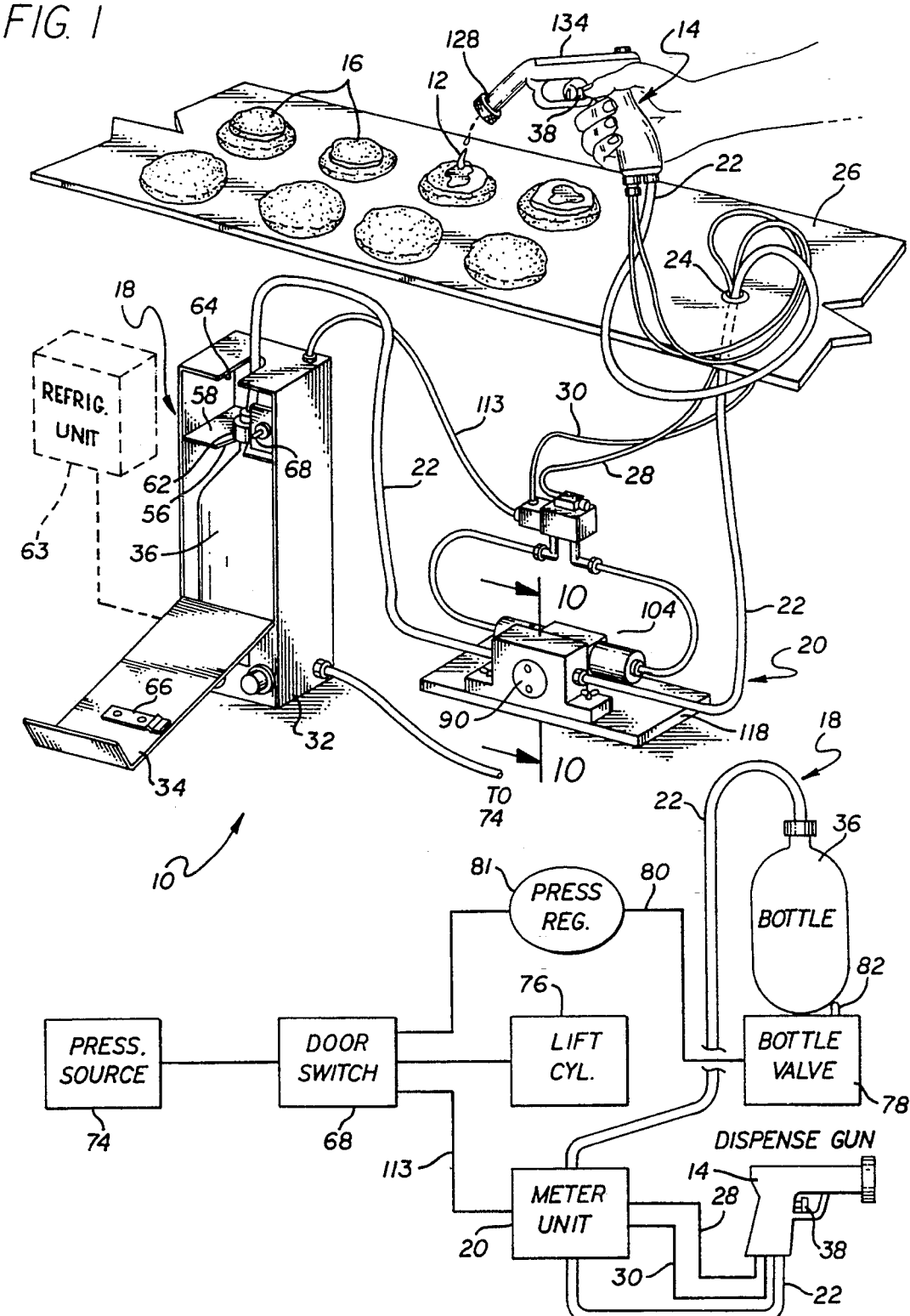
FIG. 1 is a fragmented and somewhat schematic perspective view illustrating an improved fluid dispenser system embodying the novel features of the invention.
FIG. 2 is a schematic representation illustrating the fluid dispenser system of FIG. 2.

As shown in the exemplary drawings, a dispenser system referred to generally in FIG. 1 by the reference numeral 10 is provided for facilitated dispensing of a selected viscous or semi-viscous fluid 12. FIG. 1 shows the dispenser system 10 to include a hand-held and manually operated dispenser gun 14 for delivering the flowable substance such as a selected condiment 12 to a succession of hamburgers 16 under preparation in a fast food restaurant or the like. The dispenser gun 14 is shown connected to a supply station 18 for receiving and pressurizing a supply of the condiment 12, and a metering unit 20 for regulating flow of the condiment 12 to the dispenser gun 14 in accurately metered volumes.

The dispenser system of the present invention is shown and described particularly for use in a fast food or similar restaurant environment wherein repeated and substantially uniform metered volumes of the flowable substance 12 must be delivered with relative precision to produce an attractive food product with consistent quality and flavor characteristics. In this regard, the dispenser system 10 is shown in FIG. 1 in a preferred configuration, wherein the supply station 18 and metering unit 20 are located in an under-counter position to avoid interfering with food production processes. A delivery conduit 22 extends through an appropriate port 24 in the counter 26, in association with appropriate pneumatic control lines 28 and 30. The system is shown for use in applying metered doses of a condiment 12 such as catsup, mustard, tartar sauce, etc., to a production sequence of hamburgers 16 or other food items, although it will be understood that other types of viscous or semi-viscous flowable substances may be handled and dispensed in other operating environments which may or may not require metered doses. For example, the dispenser system 10 may be used to deliver accurately metered volumes of paint or paint pigments used to mix paint of selected color, or to deliver other substances such as adhesives and/or components thereof.

In general terms, with reference to FIGS. 1 and 2, the supply station 18 includes a relatively compact housing 32 having a hinged safety door 34 to permit removable placement into the housing interior of a supply bottle 36 filled with the selected condiment 12. The supply bottle 36 is connected to the delivery conduit 22 which extends to the metering unit 20, and further to the dispenser gun 14. When the safety door 34 is closed and locked, the contents of the supply bottle 36 is pressurized for regulated pressure-caused flow of the condiment 12 to the dispenser gun, in response to manual operation of a trigger switch 38. In the preferred form, as will be described detail, the illustrative system is designed for rapidly dispensing the selected condiment 12 in metered doses up to about one ounce at a rate of one dose per second.

FIGS. 3 and 4 illustrate the supply bottle 36 in one preferred form. More specifically, the supply bottle 36 comprises a plastic blow-molded outer shell 40 of relatively rigid or semi-rigid construction, such as blow-molded PET plastic. The outer shell 40 normally has a generally hemispherical bottom wall 42 which is mounted by an adhesive connection or the like into a base cup 44 adapted to support the bottle in a upright position on a flat surface. The upper end of the bottle shell 40 defines an upwardly projecting neck 46, typically including a rigid neck transfer ring 48 in combination with external threads 50 to permit thread-on mounting of a conventional closure cap 52.

A flexible inner liner 54 is positioned within the outer shell 40 of the supply bottle 36 and defines a deformable bladder adapted to be filled with the condiment 12 or other flowable substance. The upper end of the liner 54 is joined to the neck 46 of the bottle shell 40, such that the liner 54 can be filled or the contents otherwise dispensed therefrom through the bottle neck 46. In the preferred form, the flexible inner liner 54 is comolded with the outer shell 40 in a blow molding process which avoids connection of the blown portion of the liner 54 to the blown portion of the shell 40, or otherwise permits delamination of these structures upon introduction of a pressurized fluid or gas into the space therebetween, as will be described.

When the safety door 34 of the supply station housing 32 is opened, as shown best in FIG. 1, the supply bottle 36 may be installed quickly and easily into the housing interior. In this regard, the bottle 36 is placed into the housing 32 in an upright position, with the neck 46 and neck ring 48 press-fitted into an open-sided slot 56 formed in a bottle support platform 58. In this position, the lower end of the bottle 36 is suspended in a self-centered position above a bottle pressurization unit 60 (FIGS. 4, 7 and 8) disposed within a lower region of the station housing 32. In addition, the neck 46 projects a short distance above the support platform 58 in a position for thread-on mounting of a ported adaptor cap 62 at an upstream end of the delivery conduit 22. The closure cap 52 on the bottle is, of course, removed prior to bottle placement into the station housing, and the adaptor cap 62 may be threaded onto the bottle neck immediately prior to bottle placement into the housing. In this regard, an open-sided conduit slot 64 is conveniently formed in a top wall of the housing 32, to accommodate bottle installation with the adapter cap 62 and associated delivery conduit 22 connected thereto. The adapter cap 62 functions to connect the upstream end of the delivery conduit 22 to the condiment 12 within the inner liner 54 of the supply bottle 36. A refrigeration unit 63 (FIG. 1) including conventional mechanical refrigeration components or otherwise including thermoelectric heat transfer devices may be provided to chill the bottle 36 and its contents 12 when mounted within the housing 32.

The safety door 34 includes a slide latch 66 for locking the door in a closed position, with the supply bottle 36 contained therein. In accordance with one feature of the invention, the slide latch 66 engages a door switch 68 to initiate pressurization of the bottle contents when the safety door is closed and locked. More particularly, with reference to FIGS. 5 and 6, the slide latch 66 is operable from the front of the door 34 by means of a knob 70 to displace the latch between an unlocked position and a locked position relative to a keeper 72 on the station housing 32. When the slide latch 66 is closed and locked, as viewed in FIG. 6, a segment of the latch 66 engages and depresses the door switch 68 to initiate bottle pressurization. Conversely, when the slide latch 66 is moved to the open position, as viewed in FIG. 5, the door switch 68 is disengaged to correspondingly disconnect a pressure source 74 (FIG. 2) such as compressed air or a $CO_2$ cartridge, from the system components. Such depressurization of the system components beneficially precludes access to the supply bottle 36 in a pressurized state.

Figure 7:
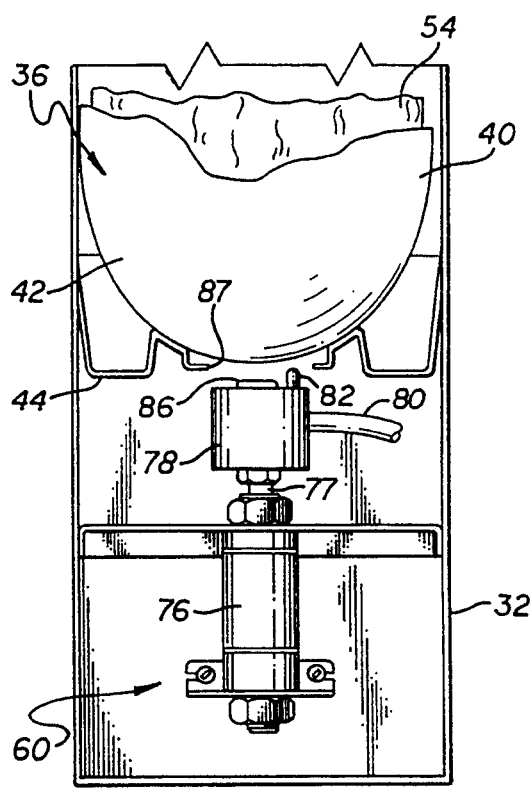
FIG. 7 is an enlarged fragmented vertical sectional view corresponding with a portion of FIG. 4, and illustrating a bottle pressure valve retracted from the supply bottle.
Figure 8:
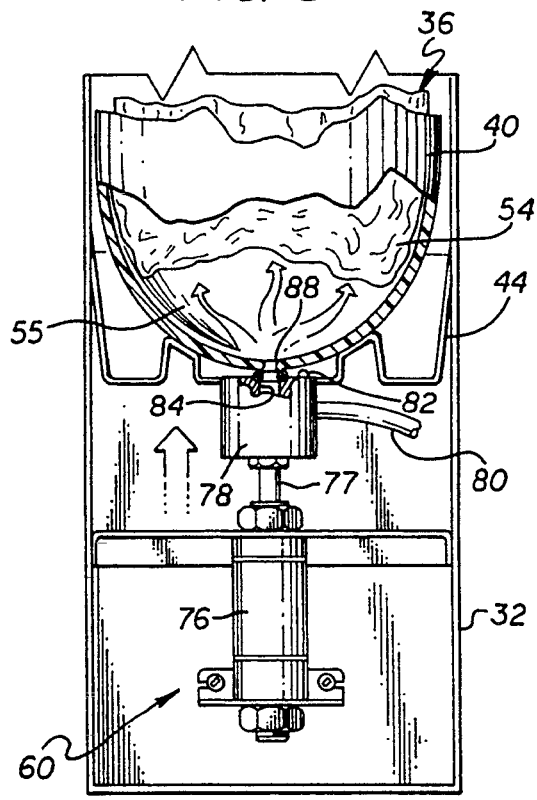
FIG. 8 is an enlarged fragmented vertical sectional view similar to FIG. 7 and showing the bottle pressure valve in engagement with the supply bottle.

FIGS. 7 and 8 illustrate operation of the bottle pressurization unit 60 to engage and pressurize the supply bottle 36, when the safety door 34 is closed and locked. As shown, the pressurization unit 60 comprises a lift cylinder 76 having a lower end mounted to the station housing 32. A movable ram 77 projects upwardly from the lift cylinder 76 and carries a bottle pressure valve 78 for engagement with the bottom of the bottle 36. In particular, when the safety door 34 is closed and locked, the pressure source 74 is coupled to the lift cylinder for displacing the ram 77 in an upward direction, for purposes of moving the pressure valve 78 into engagement with the bottom of the bottle, as shown in FIG. 8. Conversely, when the safety door 34 is unlocked, the door switch 68 disconnects the lift cylinder 76 from the pressure source 74, resulting in downward displacement of the ram 77 and the pressure valve 78 carried thereon, to the position spaced from the bottle as shown in FIG. 7. Although the lift cylinder 76 may take various forms, one preferred commercial device is marketed by Clippard Instrument Laboratory, Inc. of Cincinnati, Ohio under Model Designation USR-17. Alternatively, the bottle pressure valve 78 may be mounted on the ram 77 or the like for simple spring-biased movement toward the bottom of the bottle 36.

The pressure valve 78 is also connected to the pressure source 74 via a pneumatic line 80, when the safety door 34 is closed and locked. The pneumatic line 80 supplies the pressurized gas through a pressure regulator 81 (FIG. 2) to a bottle switch 82 and further through a flow port 84 having an open downstream end lined by an 0-ring gasket 86 positioned to engage the bottom of the supply bottle 36. More particularly, upward translation of the pressure valve 78 moves the pressure valve 78 in an upward direction as viewed in FIG. 8. The pressure valve 78 fits through a central opening 87 in the bottle base cup 44, such that the gasket 86 moves into sealed engagement with the lower end of the bottle shell 40, with the flow port 84 in communication with a pressure inflow port 88 (FIG. 8) at the bottom of the bottle. This sealed engagement of the pressure valve 78 with the bottle bottom is accompanied by depression of the bottle switch 82 upon contact with the bottle bottom, to open the flow path for the pressurization gas into the bottle interior. Once again, while the specific construction details of the pressurization valve 78 may vary, a preferred device is marketed by Clippard Instruments Laboratory, Inc. of Cincinnati, Ohio under Model Designation MAV-2C.

As shown in FIG. 8, the pressurized gas flow to the supply bottle 36 passes through the inflow port 88 to the space between the outer shell 40 and the inner flexible liner 54 of the bottle. The pressurized gas thus fills a pressure chamber 55 defined by the space between the shell and liner to subject the liner 54 to a regulated pressure, for purposes of forcing the liner to collapse while correspondingly forcing the condiment 12 to flow from the bottle through the adaptor cap 62 and delivery conduit 22. Importantly, however, closure of the safety door 84 without prior installation of a supply bottle 36 will not result in flow of the pressurized gas into the interior of the housing, since the bottle switch 82 on the elevated pressure valve 78 will not be depressed and thus will not detect the presence of a bottle within the housing 32.

The flowable condiment 12 exits the supply bottle 36 for passage through the delivery conduit 22 to the metering unit 20. In general operation, the metering unit 20 responds to manual actuation of the trigger switch 38 on the dispenser gun 14 to regulate condiment dispensing in the desired discrete doses of precision metered volume.

The metering unit 20 is shown in more detail in FIGS. 9-12, and generally comprises a cylindrical rotary core 90 carried within a housing block 92 mounted in-line with the delivery conduit 22. More particularly, the housing block 92 has an inlet fitting 93 and an outlet fitting 94 for in-line connection with the delivery conduit 22, at diametrically opposed positions with respect to a relatively large and generally circular cross bore 96. The rotary core 90 has a generally cylindrical shape adapted for slide-fit installation into the cross bore 96 of the housing block 92. A metering cylinder 98 is formed to extend diametrically through the core 90, for in-line positioning between the inlet and outlet fittings 93 and 94, upon appropriate rotational orientation of the core 90 within the housing block 92. O-ring seals 100 are provided on the core 90 at axially opposite sides of the metering cylinder 98 for sealed engagement with the housing block 92 within the cross bore 96.

FIGS. 11 and 12 show the metering cylinder 98 with the rotary core 90 to have a cross sectional size which is somewhat greater than the flow path defined by the inlet and outlet fittings 93 and 94. A metering piston 102 is slidably fitted into the metering cylinder 98 for translation back-and-forth therein, as will be described in more detail. The metering piston 102 thus also has a cross sectional size which is greater than the flow paths defined by the fittings 93 and 94, such that the piston 102 cannot travel beyond the periphery of the rotary core 90.

In normal operation, the pressurized condiment within the supply bottle 36 flows through the delivery conduit 22 to the inlet fitting 93 of the metering unit 20. This condiment flow, under pressure as previously described, forces the metering piston 102 to displace along the metering cylinder 98 to a downstream end thereof as shown in FIG. 11, provided that the metering cylinder 98 is aligned with the fittings 93 and 94. Such displacement of the piston 102 to the downstream end of the metering cylinder 98 effectively fills the metering cylinder 98 with a measured volume of the condiment to be dispensed.

When dispensing is desired, the rotary core 90 is moved through a part-circle stroke of one-half revolution within the housing block 92, in the direction of arrow 103 in FIG. 12. This half-revolution movement of the core 90 reverses the position of the metering piston 102 to the upstream end of the metering cylinder 98. As the cylinder 98 returns to a rest position disposed in-line with the fittings 93 and 94, the pressurized condiment within the supply bottle 36 again forces the piston to translate through the cylinder 98 toward the downstream end thereof. During this return motion to the downstream end of the cylinder 98, the piston 102 effectively dispenses the measured volume of the condiments 12 through the outlet fitting 94, while permitting a subsequent measured volume to flow into and re-fill the metering cylinder 98. Sequential rotation of the core 90 through half-revolution strokes is thus effective to dispense metered increments of the condiment 12 through the outlet fitting 94.

The metering unit 20 includes a rotary actuator 104 for displacing the core 90 through the desired half-circle strokes. As shown best in FIGS. 1 and 9, the rotary actuator comprises a bi-directional pneumatic cylinder device having a control valve 106 for supplying pneumatic pressure through a pair of pressure lines 107 and 108 to opposite ends of an actuator unit 110. The control valve 106 is operated each time the trigger switch 38 is depressed, by means of connecting the dispenser gun 14 to the control valve 106 via the pneumatic control lines 28, 30, to rotate a driven hub 112 through half-circle increments. The control valve 106 is supplied with control fluid under pressure from the source 74 via a pneumatic lure 113, when the safety door is closed and locked. The hub 112 includes a pair of axial drive pins 114 which slide-fit into matingly positioned drive ports 116 in the rotary core 90. Although the construction details of this rotary actuator may take various forms, one preferred actuator device is marketed by Bimba Manufacturing Company of Monee, Ill. under the name Bimba Pneu-Turn Rotary Actuator.

Figure 9:
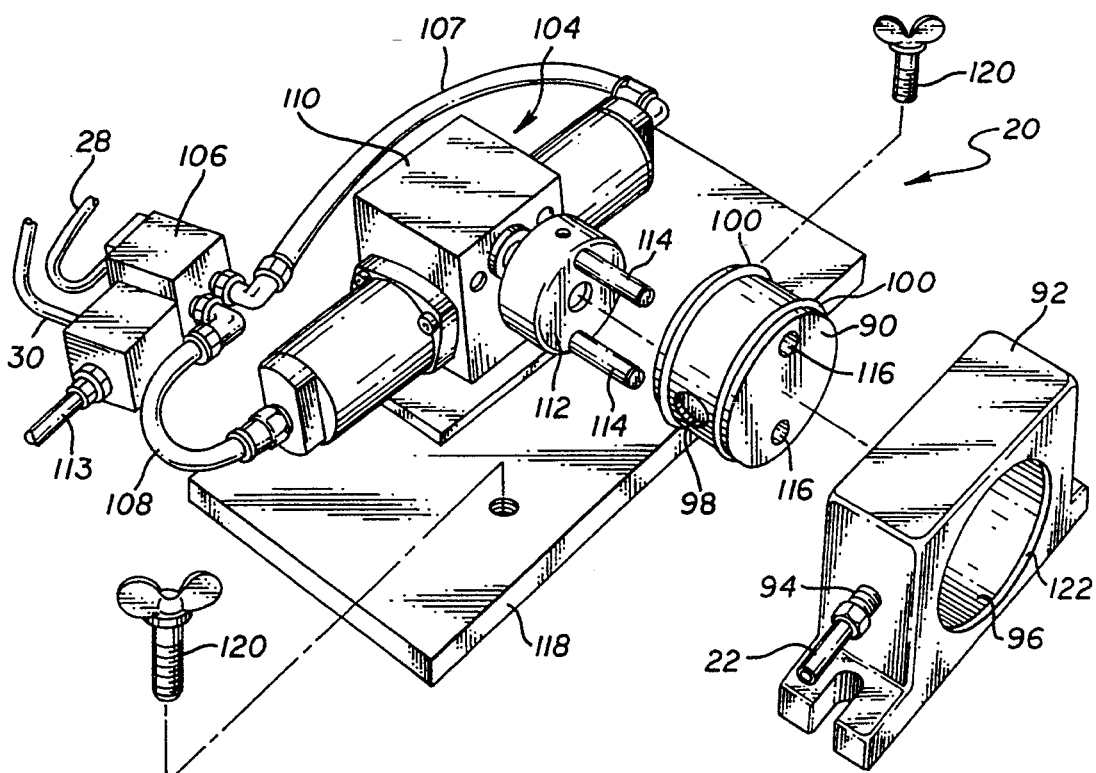
FIG. 9 is an enlarged and exploded perspective view illustrating a metering unit for use in the invention.

FIG. 9 shows the metering unit 20 in a convenient form adapted for rapid assembly and disassembly for cleaning and maintenance purposes as required for example, in a food service environment. For example, the rotary actuator unit 110 is mounted in a fixed position onto a base plate 118 which can be securely fastened, for example, in an under-counter position in a food service establishment. The housing block 92 is adapted for removable connection by wing nuts 120 or other suitable quick release fasteners onto the base plate 118, in a position with the drive pins 114 engaging the core 90 within the housing block. The housing block 92 and core 90 are disassembled quickly and easily by removing the wing nuts 120, followed by slide-off displacement of the core 90 from the drive pins 114. With this arrangement, the fluid-contacting components of the metering unit may be disassembled quickly and easily for cleaning at the end of a business day, and correspondingly simple reassembly for resumed operation. Moreover, a short radially inwardly extending flange 122 may be provided at the axial outboard side of the cross bore 96, for accurately locating the core 90 in a operational position restrained between the flange 122 and the drive hub 112.

The dispenser gun 14 is shown in FIGS. 13 and 14, and comprises a relatively compact and lightweight pistol-shaped implement. The dispenser gun 14 includes a handgrip 124 having a base end suitably connected to the metering unit via the pneumatic control lines 28, 30, which are coupled in turn to the trigger switch 38. The delivery conduit 22 extends through the hand grip 124 and curves through a barrel 126 to a downstream end secured as by threading within a spout 128. An antidrool valve disk 130 is conveniently mounted over the spout 128 by a threaded clamp ring 132 or the like. FIG. 13 shows a removable cap member 134 of a domed semicircular cross section forming a portion of the barrel 126, wherein the cap member may be removed by means of a screw 136 to facilitate installation of the delivery conduit 22 and/or removal thereof for cleaning purposes.

In use, the food service operator can manipulate the dispenser gun 14 quickly and easily over a production array of food items, such as the hamburgers 16 shown in FIG. 1, with appropriate depression of the trigger switch 38 to dispense metered volumes of the condiment 12. Such dispensing may occur rapidly, as fast as one cycle per second, with the metered dispensed volume corresponding with the cross sectional volume of the metering cylinder 98 less the volume occupied by the piston 102. In this regard, different specific metered volumes may be selected quickly and easily by appropriate interchange of a rotary core having the appropriate metering cylinder of the selected volume, or by use of a piston 102 of different volumetric size. The metering unit regulates condiment flow so that the selected measured volume is supplied incrementally to the dispenser gun 14 for dispensing through the spout 128. The anti-drool valve disk 130 prevents undesired dripping of the condiment between dispense cycles.

FIG. 15 shows one alternative form of the invention, wherein a modified supply station housing 32' is adapted for receiving and supporting a plurality of the supply bottles 36, constructed as previously described. In this variation, each of the supply bottles 36 is separately supported within the housing 32', and connected via a corresponding adapter cap 62 to a dedicated delivery conduit 22. A hinged safety door 34' has a latch 66 for engaging a door switch 68 in the closed and locked position, resulting in supply of pressurization fluid to a plurality of bottle pressurization units 60 (not shown in FIG. 15) mounted respectively beneath each of the supply bottles 36. Importantly, the bottle switch 82 on each pressurization unit 60 prevents flow of the pressurizing fluid, unless a supply bottle 36 is mounted in association therewith. Accordingly, the multi-bottle housing 32' is operational, even though one or more of the bottle mounting positions is vacant. The multiple delivery conduits 22 will normally each be connected to an associated metering unit 20 and dispenser gun 14 to provide the capability of dispensing the same or several different flowable substances at the same time.

FIGS. 16–18 show an alternative dispenser gun 14' having the metering unit 20' mounted therein. In this version of the invention, a handgrip 124' is connected to the delivery conduit 22 for fluid flow passage to a manifold 140 at an upstream side of a cylindrical gun housing 142. A rotating metering core 90' is carried within a cross bore 96' of the housing 142 and is shown with an axially spaced plurality of diametrically formed metering cylinders 98' disposed at 60° intervals with respect to each other. Each cylinder 98' has a metering piston 102 therein for metering fluid flow in the same manner as previously described. A retractable trigger lever 144 on the gun 14' operates a spring-loaded pawl 146 to rotate the core 90° through part-circle strokes of approximately 60° increments. Such rotation of the core 90° aligns the three metering cylinders 98' one at a time for condiment flow passages from the manifold 140 to a dispenser spout 128' which may be multiported, as shown.

In another variation of the invention, the multibarreled dispenser gun 14' of FIGS. 16–18 may be manifolded such that each cylinder 98' therein is separately connected to a dedicated conduit 22 associated with a different condiment. Thus, the gun can be coupled with several different supply bottles such as the three bottles shown in FIG. 15, with a different condiment being dispensed upon successive operation of the lever 144. The multiple dispense ports can be arranged side-by-side as shown in FIG. 16, or otherwise oriented in concentric circles or the like.

A further alternative form of the invention is shown in FIG. 19 wherein a condiment self-serve station 150 is shown. In this embodiment, a supply station and metering unit may be installed at a convenient sealed location, such as under a counter 152, with the delivery conduit 22 extending through the counter to a rear side of the self-service station 150. Within the station 150, the delivery conduit passes through a dispenser gun structure (not shown), wherein the trigger switch 154 is mounted on a face panel of the unit 150 for direct customer access. A food product such as a hamburger 16 can be placed by the customer at a position beneath a spout 128", in a position to receive a measured or metered volume of the condiment 12 each time the trigger switch 154 is depressed by the customer. In this embodiment, the condiment supply is not accessible to store customers, and the condiment is dispensed in regulated volumes to reduce the likelihood of condiment waste.

The station configuration of FIG. 9 may be modified for use with a multiple bottle supply station 32' of the type shown in FIG. 15, with corresponding multiple trigger switches 154 for push-button or similar operation to dispense accurately metered volumes of different fluid. Such arrangement is suited for dispensing different condiments in a restaurant application, or for use in other dispensing environments such as custom color paint mixing or the like.

The dispenser system 10 of the present invention, in its various embodiments, thus provides an effective and accurate system and method for dispensing repeatable metered volumes of one or more flowable substances. The fluids can be dispensed quickly and easily by use of relatively lightweight and easily manipulated dispenser devices, thereby reducing personnel fatigue. The dispenser gun may be configured in a form which is easy to handle and provides high visibility of the precise application point to which the fluid substance is dispensed.

A variety of further modifications and improvements to the dispenser system of the present invention will be apparent to those skilled in the art. Accordingly, no limitation on the invention is intended by way of the forgoing description and accompanying drawings, except as set forth in the appended claims.

What is claimed is:

1. A fluid dispenser system, comprising:
a supply bottle including an outer shell having an open mouth and pressure port formed therein at spaced locations, and a deformable inner liner within said outer shell and connected to said outer shell generally at said mouth to permit fluid flow into and from said inner liner through said mouth, said outer shell and inner liner cooperatively defining a pressure chamber therebetween in flow communication with said pressure port;
a supply station for receiving and supporting said supply bottle, and including means for connecting a pressure source via said pressure port to said pressure chamber thereby pressurizing said inner liner and fluid contained therein, said supply station including means for supporting said supply bottle generally at the mouth thereof, and pressure valve means for connecting the pressure source to said pressure chamber;

a delivery conduit connected to said bottle mouth for pressure-caused flow of the fluid from said inner liner; and dispenser control means for regulating fluid flow through said delivery conduit.

2. The dispenser system of claim 1 wherein said supply bottle has said open mouth and said pressure port formed therein at opposite ends thereof.

3. The dispenser system of claim 1 wherein said supply bottle comprises a blow-molded plastic bottle.

4. The dispenser system of claim 1 wherein said outer shell of said supply bottle is relatively rigid in comparison to said inner liner.

5. The dispenser system of claim 1 wherein said pressure source comprises a pressurized gas.

6. The dispenser system of claim 1 wherein said pressure valve means sealingly engages said outer shell in surrounding relation to said pressure port, said pressure valve means further including means for connecting the pressure source to said pressure chamber upon sealing engagement with said outer shell.

7. The dispenser station of claim 6 wherein said supply station includes a housing for receiving and supporting said supply bottle therein, said housing including a door movable between an open position to permit said supply bottle to be removably placed into said housing and a closed position to prevent access to said supply bottle within said housing, and safety switch means for preventing connection of the pressure source to said pressure chamber unless said door is in the closed position.

8. The dispenser system of claim 7 wherein said pressure valve means includes means for detecting the presence of a supply bottle within said housing, and for permitting flow of fluid from the pressure source through said pressure valve means only when said supply bottle is mounted within said housing.

9. The dispenser system of claim 7 wherein said pressure valve means includes means responsive to closure of said door to displace said means for sealingly engaging said outer shell from an inoperative position spaced from said outer shell to an operative position for engaging said outer shell, and means responsive to opening of said door for movement of said sealingly engaging means from said operative position to said inoperative position.

10. The dispenser system of claim 7 wherein said pressure valve means includes means for maintaining said sealingly engaging means in engagement with said outer shell while said supply bottle is within said housing and said door is in the closed position.

11. The dispenser system of claim 7 wherein said supply station further includes temperature control means for regulating the temperature within said housing.

12. The dispenser system of claim 1 wherein said delivery conduit includes an upstream end having an adaptor cap thereon for connection to said supply bottle to permit flow of fluid contained within said inner liner through said mouth and adapter cap to said delivery conduit.

13. The dispenser system of claim 1 wherein said dispenser control means comprises a dispenser gun mounted in-line with said delivery conduit, and trigger means on said dispenser gun for regulating fluid flow through said delivery conduit.

14. The dispenser system of claim 13 wherein said trigger means comprises a pneumatic trigger.

15. The dispenser system of claim 13 wherein said trigger means comprises a manual trigger.

16. The dispenser system of claim 13 further including a metering unit mounted in-line along said delivery conduit and operable to permit pressure-caused flow of the fluid through said delivery conduit in predetermined metered volumes, said trigger means being for operating said metering unit.

17. The dispenser system of claim 16 wherein said dispenser gun is mounted along said delivery conduit at a location downstream from said metering unit.

18. The dispenser system of claim 16 wherein said dispenser gun has said metering unit mounted therein.

19. The dispenser system of claim 13 wherein said dispenser gun includes a dispense spout disposed at a downstream end of said delivery conduit, and further including antidrool means for preventing fluid drool from said spout.

20. The dispenser system of claim 1 further including a metering unit mounted in-line along said delivery conduit and operable for permitting pressure-caused flow of the fluid therethrough in predetermined metered volumes, said dispenser control means being for operating said metering unit.

21. A fluid dispenser system, comprising:

a supply bottle including an outer shell having an open mouth and pressure port formed therein at spaced locations, and a deformable inner liner within said outer shell and connected to said outer shell generally at said mouth to permit fluid flow into and from said inner liner through said mouth, said outer shell and inner liner cooperatively defining a pressure chamber therebetween in flow communication with said pressure port;

a supply station for receiving and supporting said supply bottle, and including means for connecting a pressure source via said pressure port to said pressure chamber thereby pressurizing said inner liner and fluid contained therein;

a delivery conduit connected to said bottle mouth for pressure-caused flow of the fluid from said inner liner;

dispenser control means for regulating fluid flow through said delivery conduit; and a metering unit mounted in-line along said delivery conduit and operable for permitting pressure-caused flow of the fluid therethrough in predetermined metered volumes, said dispenser control means being for operating said metering unit; said metering unit comprising a rotatable core having a generally diametrically extending metering cylinder extending therethrough with a metering piston received slidably within said cylinder, and said control means comprising means for moving said core to a position disposed generally in-line with said delivery conduit whereby fluid within said inner liner is permitted to flow under pressure to said cylinder to displace said piston to a downstream end of said cylinder while filling the residual volume of said cylinder with a metered volume of the fluid, said core moving means including means for rotating said core to reverse the orientation of said cylinder relative to said delivery conduit and thereby move said piston to an upstream end of said cylinder, whereby said metered volume of the fluid within said cylinder is discharged to said delivery conduit for dispensing and a subsequent metered fluid volume is permitted to flow under pressure from said inner liner to said cylinder to again displace said piston to the downstream end of said cylinder.

22. The dispenser system of claim 21 wherein said core moving means displaces said core through one-half revolutions.

23. The dispenser system of claim 21 wherein said core has a plurality of said metering cylinders formed therein each having a metering piston mounted therein.

24. The dispenser system of claim 23 further including manifold means at an upstream and of said core for connecting said delivery conduit to said cylinders.

25. The dispenser system of claim 21 wherein said metering piston has a cross sectional size and shape to prevent movement thereof beyond a downstream end of said cylinder.

26. The dispenser system of claim 21 wherein said metering cylinder has a cross sectional size greater than a cross sectional size of said delivery conduit.

27. The dispenser system of claim 21 wherein said core moving means comprises a pneumatic actuator.

28. The dispenser system of claim 21 wherein said core moving means comprises means for manually rotating said core through predetermined rotational increments.

29. The dispenser system of claim 21 wherein said metering unit further includes a core block having inlet and outlet fittings connected in-line with said delivery conduit, said core being mounted within a cross-bore formed in said core block and adapted for slide-out removal for facilitated cleaning.

30. The dispenser system of claim 29 wherein said core moving means comprises a pneumatic actuator having a rotatable drive hub, said core being mounted axially between said drive hub and a retainer flange on said core block.

31. A fluid dispenser system for use with a supply bottle including an outer shell having an upper end defining a neck with an open mouth formed therein and a lower end having a pressure port formed therein, said supply bottle further including a deformable inner liner within said outer shell and connected to said neck to permit fluid flow into and from said inner liner through said mouth, said outer shell and inner liner cooperatively defining a pressure chamber therebetween in flow communication with said pressure port, said dispenser system comprising:

a supply station including a housing having means for receiving and supporting said supply bottle, said housing including a door movable between an open position to permit removable placement of said supply bottle into said housing, and a closed position to prevent access to said supply bottle, pressure valve means for engaging said outer shell at said pressure port and for connecting a pressure source through said pressure port to said pressure chamber when said door is closed, thereby pressurizing said inner liner and fluid contained therein for pressure-caused flow of the fluid from said inner liner through said mouth; and a delivery conduit connected to said bottle neck for flow of the fluid from said inner liner through said delivery conduit.

32. The dispenser system of claim 31 further including dispenser control means for regulating fluid flow through said delivery conduit.

33. The dispenser system of claim 32 including a metering unit mounted in-line along said delivery conduit and operable for permitting pressure-caused flow of the fluid therethrough in predetermined metered volumes, said dispenser control means being for operating said metering unit.

34. The dispenser system of claim 31 wherein said supply station further includes means for engaging said bottle neck to support said supply bottle in a generally upright position.

35. The dispenser system of claim 31 wherein said pressure valve means includes means for detecting the presence of said supply bottle within said housing and for permitting flow of fluid from the pressure source only when said supply bottle is detected.

36. The dispenser system of claim 31 wherein said supply bottle comprises a blow-molded plastic bottle.

37. The dispenser system of claim 31 wherein said supply station further includes safety switch means for preventing connection of the fluid pressure source to said pressure chamber unless said door is in the closed position.

38. The dispenser station of claim 33 further including a dispenser gun mounted in-line with said delivery conduit, said dispenser control means comprising trigger means on said dispenser gun for operating said metering unit.

39. The dispenser station of claim 38 wherein said dispenser gun includes a dispense spout disposed at a downstream end of said delivery conduit, and further including antidrool means for preventing fluid drool from said spout.

40. The dispenser system of claim 33 wherein said metering unit comprises a rotatable core having a generally diametrically extending metering cylinder extending therethrough with a metering piston received slidably within said cylinder, and said control means comprising means for moving said core to a position disposed generally in-line with said delivery conduit whereby fluid within said inner liner is permitted to flow under pressure to said cylinder to displace said piston to a downstream end of said cylinder while filling the residual volume of said cylinder with a metered volume of the fluid, said core moving means including means for rotating said core to reverse the orientation of said cylinder relative to said delivery conduit and thereby move said piston to an upstream end of said cylinder, whereby said metered volume of the fluid within said cylinder is discharged to said delivery conduit for dispensing and a subsequent metered fluid volume is permitted to flow under pressure from said inner liner to said cylinder to again displace said piston to the downstream end of said cylinder.

41. The dispenser system of claim 40 wherein said metering piston has a cross sectional size and shape to prevent movement thereof beyond a downstream end of said cylinder.

42. The dispenser station of claim 31 for use with a plurality of said supply bottles, said supply station housing including means for receiving and supporting said plurality of said supply bottles and a corresponding plurality of said pressure valve means associated respectively with said supply bottles.

* * * * *